(12) United States Patent
Chambliss (10) Patent No.: US 8,984,521 B2
(45) Date of Patent: Mar. 17, 2015

(54) COMPUTER SYSTEM PERFORMANCE BY APPLYING RATE LIMITS TO CONTROL BLOCK TENANCY

(75) Inventor: David D. Chambliss, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 959 days.

(21) Appl. No.: 12/707,829

(22) Filed: Feb. 18, 2010

(65) Prior Publication Data

US 2011/0202926 A1 Aug. 18, 2011

(51) Int. Cl.
*G06F 9/46* (2006.01)
*G06F 9/50* (2006.01)

(52) U.S. Cl.
CPC ...... *G06F 9/5038* (2013.01); *G06F 2209/5021* (2013.01)
USPC ........................................ 718/104

(58) Field of Classification Search
None
See application file for complete search history.

(56) References Cited

U.S. PATENT DOCUMENTS

| | | |
|---|---|---|
| 6,263,359 B1 | 7/2001 | Fong et al. |
| 6,304,906 B1 | 10/2001 | Bhatti et al. |
| 6,829,765 B1 * | 12/2004 | Chan et al. ............ 718/104 |
| 6,859,926 B1 | 2/2005 | Brenner et al. |
| 7,178,147 B2 | 2/2007 | Benhase et al. |
| 7,228,354 B2 | 6/2007 | Chambliss et al. |
| 7,322,034 B2 | 1/2008 | Crawford, Jr. et al. |

* cited by examiner

*Primary Examiner* — Gregory A Kessler
(74) *Attorney, Agent, or Firm* — Lieberman & Brandsdorfer, LLC (57) ABSTRACT

Embodiments of the invention are provided to enable fair and balanced allocation of control blocks to support processing of requests received from a client machine. The server is configured with tools to manage an account balance of control block availability for each service class. The account balance is periodically adjusted based upon usage, tenancy, deficits, and passage of time. Processing of one or more tasks in a service class is support when the credit value in the service class account is equal to or greater than the entry cost estimated for the request.

18 Claims, 7 Drawing Sheets

COMPUTER SYSTEM PERFORMANCE BY APPLYING RATE LIMITS TO CONTROL BLOCK TENANCY

BACKGROUND

1. Technical Field

Embodiments of the invention relate to storage server and server-based computer system employed to service streams of tasks received from multiple clients. Each task performs one or more operations with reference to data held by the server, including returning data to the requesting client and/or modifying the data. More specifically, the invention relates to assuring acceptable performance to all client machines invoking the services of the server.

2. Background

A control block is one of a collection of interchangeable resources within the computer system, one of which must be associated exclusively to a single task in order for that task to perform a given step or series of steps. In a distributed computer system that includes multiple clients submitting tasks to the server, an overload of tasks from one or more clients can block timely completion of tasks from other clients. Mitigation of availability of control blocks to support a task may result in degradation of high priority work, starvation, priority inversion, etc.

A control block is a single-tenancy resource, which means that it can be associated with only a single task at a time. A control block can itself be a resource that must be used to perform a given step or series of steps. A control block can also be a resource that enables a task to use a second resource, which might support multi-tenancy, meaning that the second resource can be used by more than one task at a time, provided that each such task is in possession of a control block for the purpose.

Allocation of control blocks among the multiple client machines may be done by allocating a large fixed number of control blocks or an adjustable number that can be expanded, defining classification rules for tasks and placing limits on the quantity of control blocks of a given type can be used in simultaneous tasks in each class, etc. However, the pool of available control blocks is limited by system constraints, and as such, the availability for expansion is limited. Similarly, by applying quotas to classes of control blocks, tasks are slowed down based upon the choice of quotas.

With an entry point rate control, each task is classified, and flow limits are applied to the tasks based on the size and number of I/O operations, a vector of flow attributes of the task, such as number of operations, number of bytes read, number of bytes written, etc., are computed before the task is processed. A token-bucket throttling discipline is applied that ensures each class cannot exceed a specified flow rate for that vector component. The task is held until sufficient credit has accumulated for all components to allow the task to be processed. Once passed, the task uses whatever resources it needs without flow limitation.

BRIEF SUMMARY

Embodiments of the invention comprise a method, system and article for improving computer system performance by applying limits to a control block occupancy rate.

In one aspect, limits are applied to a control block occupancy rate to improve system performance. At least one service task is received from a client, and the received task is assigned to a service class. For each service class, an allowed occupancy rate is determined with reference to a total occupancy rate. The allowed occupancy rate is an allowed average number of tasks that are each simultaneously served by its own control block, wherein the control block is one of a collection of interchangeable resources to be associated exclusively with a single task. At least one control block is acquired for a task. Release is controlled for processing of each task to support compliance of an actual tenancy rate for the service class with the allowed occupancy rate.

In another aspect, a computer system is provided with a server in communication with a client machine across a network. A manager is provided local to the server and is configured to receive at least one service task from the client. Each service class has a director to determine an allowed occupancy rate with reference to a total available occupancy rate. The allowed occupancy rate is an allowed average number of tasks each simultaneously served by its own control block, and the control block is one of a collection of interchangeable resources to be associated exclusively with a single task. The manager is configured to selectively acquire at least one control block for a task. For each service class, the director controls a release for processing of each task to support compliance with an actual tenancy rate with the allowed occupancy rate for the service class.

In yet another aspect, an article is provided with a computer-readable storage medium including computer program instructions configured to improve computer system performance by applying limits to a control block occupancy rate. Instructions are provided to receive at least one service task from a client and to assign the received service task to a service class. In addition, instructions are provided to determine for each service class an allowed occupancy rate with reference to a total available occupancy rate. The allowed occupancy rate is an allowed average number of tasks each simultaneously served by its own control block. The control block is one of a collection of interchangeable resources to be associated exclusively with a single task. Instructions are provided to selectively acquire at least one control block for a task, and to control a release to process each task. The controlled release supports compliance of an actual tenancy rate for the service class with the allowed occupancy rate.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not all embodiments of the invention unless otherwise explicitly indicated. Implications to the contrary are otherwise not to be made.

DETAILED DESCRIPTION

It will be readily understood that the components, as generally described and illustrated in the Figures herein, may be arranged and designed in a wide variety of different configurations. Thus, the following detailed description of the embodiments of the apparatus, system, and method, as presented in the Figures, is not intended to limit the scope of the invention, as claimed, but is merely representative of selected embodiments.

The functional units described in this specification have been labeled as managers and directors. A manager and/or director may be implemented in programmable hardware devices such as field programmable gate arrays, programmable array logic, programmable logic devices, or the like. The manager and/or director may also be implemented in software for execution by various types of processors. An identified manager and/or director of executable code may, for instance, comprise one or more physical or logical blocks of computer instructions which may, for instance, be organized as an object, procedure, function, or other construct. Nevertheless, the executables of an identified manager and/or director need not be physically located together, but may comprise disparate instructions stored in different locations which, when joined logically together, comprise the manager and/or director and achieve the stated purpose of the manager and/or director.

Indeed, a manager and/or director of executable code could be a single instruction, or many instructions, and may even be distributed over several different code segments, among different applications, and across several memory devices. Similarly, operational data may be identified and illustrated herein within the manager and/or director, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of recovery manager, authentication module, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments will be best understood by reference to the drawings, wherein like parts are designated by like numerals throughout. The following description is intended only by way of example, and simply illustrates certain selected embodiments of devices, systems, and processes that are consistent with the invention as claimed herein.

Overview

Classification criteria and classes for tasks are established as a matter of system design, system configuration, and system operation. For each class of tasks and each control block type, a control block account balance is maintained and adjusted in response to both passage of time and processing of tasks. A credit is increased in proportion to the allowed occupancy rate and elapsed time, both of which are subject to a maximum criteria. Similarly, the credit is decreased upon completion of each task in proportion to the actual tenancy of the corresponding control block type. Tasks presented for processing are only admitted when there is a non-negative credit balance with sufficient credit to accommodate an entry cost for the tasks. More specifically, the task is admitted for processing only when the credit associated with each control block type and with the class of the tasks is greater than or equal to the entry costs for that task and control block type. As task processing is completed, the processing costs are determined and the credit balance is adjusted.

Technical Details

In the following description of the embodiments, reference is made to the accompanying drawings that form a part hereof, and which show by way of illustration the specific embodiment in which the invention may be practiced. It is to be understood that other embodiments may be utilized because structural changes may be made without departing from the scope of the present invention.

The invention is directed to a storage server and server system which are used to service streams of tasks submitted by multiple client machines. Each task performs an operation with reference to data held by the server. In one embodiment, the tasks may modify the data held by the server. Similarly, in one embodiment, the server returns data to the client in response to running the task. It is known in the art that a server may be in communication with multiple client machines, and thus responsible for managing receipt and processing of multiple tasks. In the case of management of multiple tasks, it is critical to manage allocation and availability of control blocks for processing of the tasks. Each control block is a member of a collection of interchangeable resources within the system, one of which must be associated exclusively to a single task in order for that task to perform a given step or set of steps. It is recognized that there may be different types of control blocks, with each type pertaining to usage and employment of different resources. Similarly, it is known in the art that one or more control blocks employed to support a task may include a scarce resource item or a common resource item. Accordingly, management of the control blocks in a fair and equitable manner is essential for efficient processing of tasks.

Figure 1:
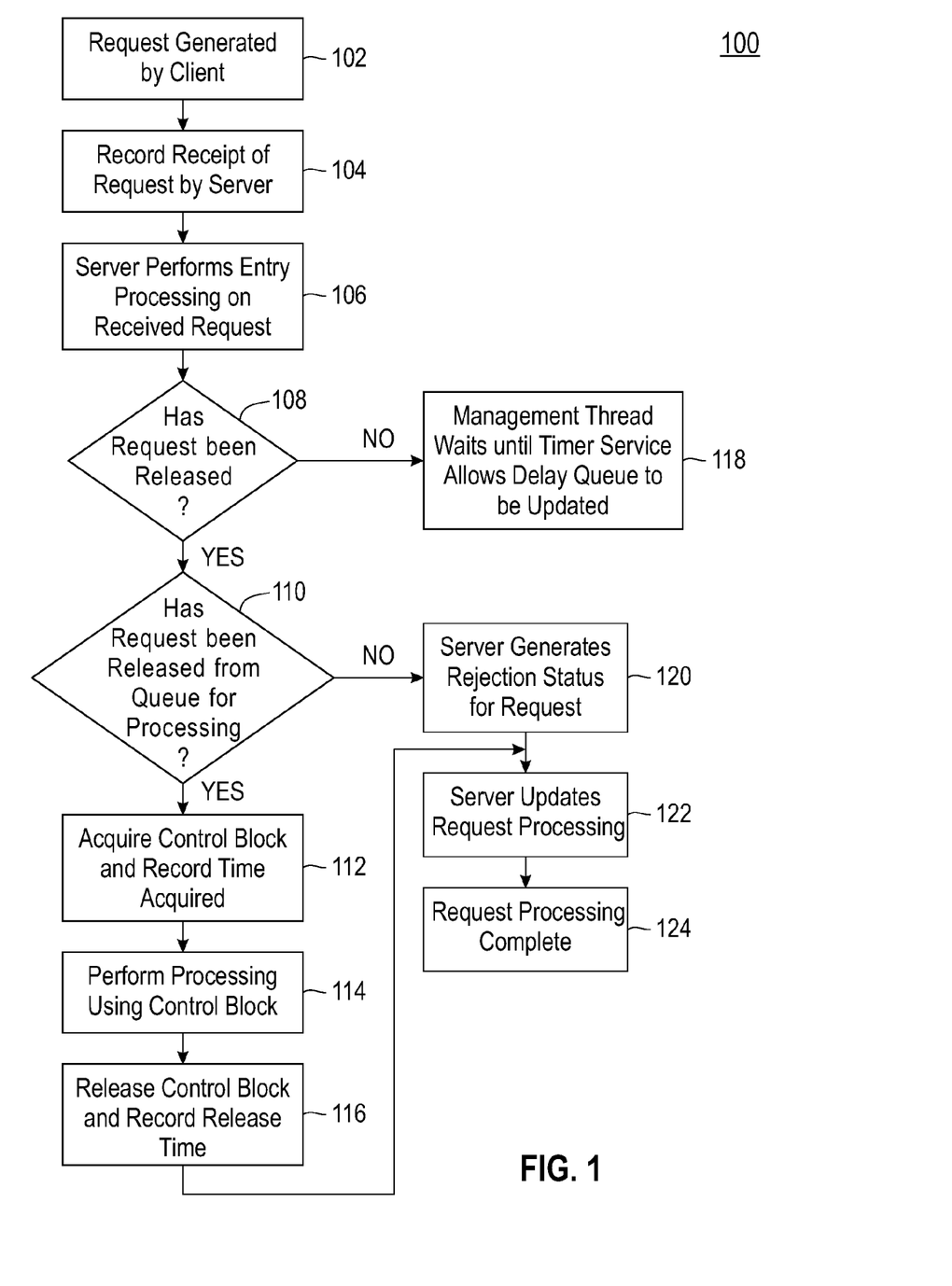
FIG. 1 is a flow chart illustrating processing a request from a client that employs one or more control blocks for completion of the associated task.
Figure 2:
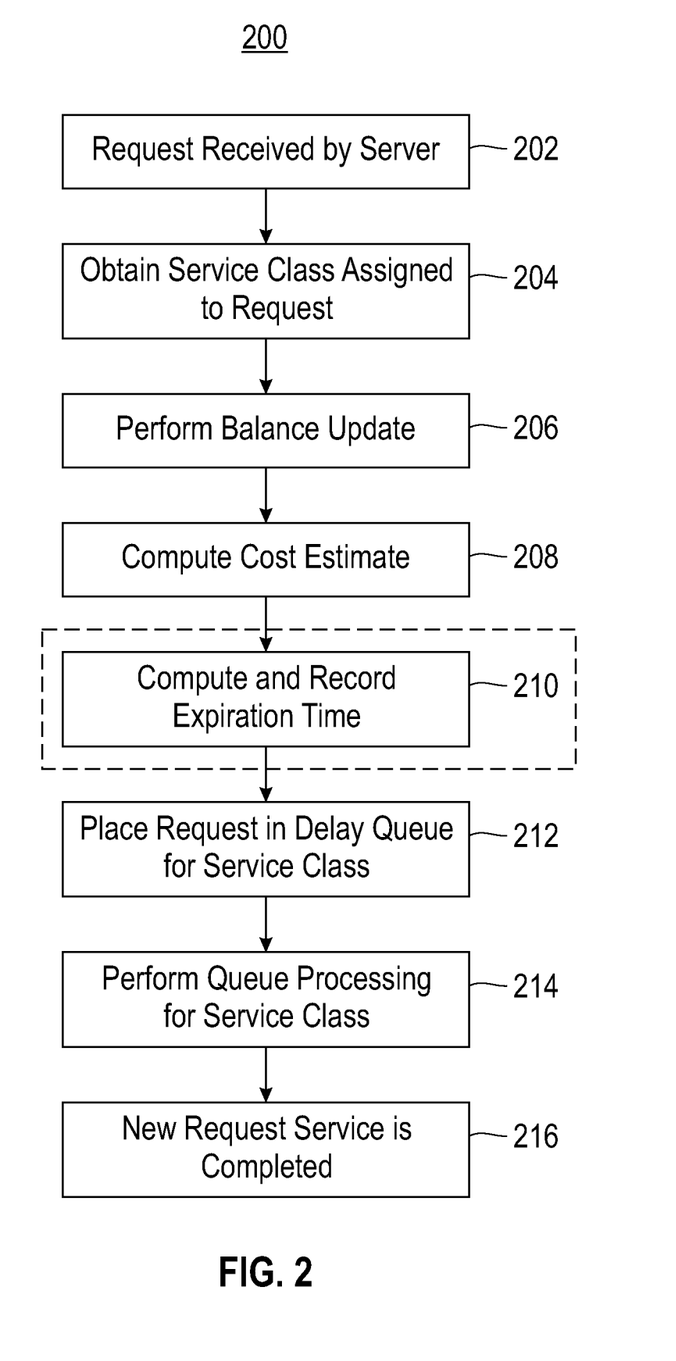
FIG. 2 is a flow chart illustrating the server end of processing a new request based upon the classification of the request and availability of control blocks required to support the request within its service class.
Figure 6:
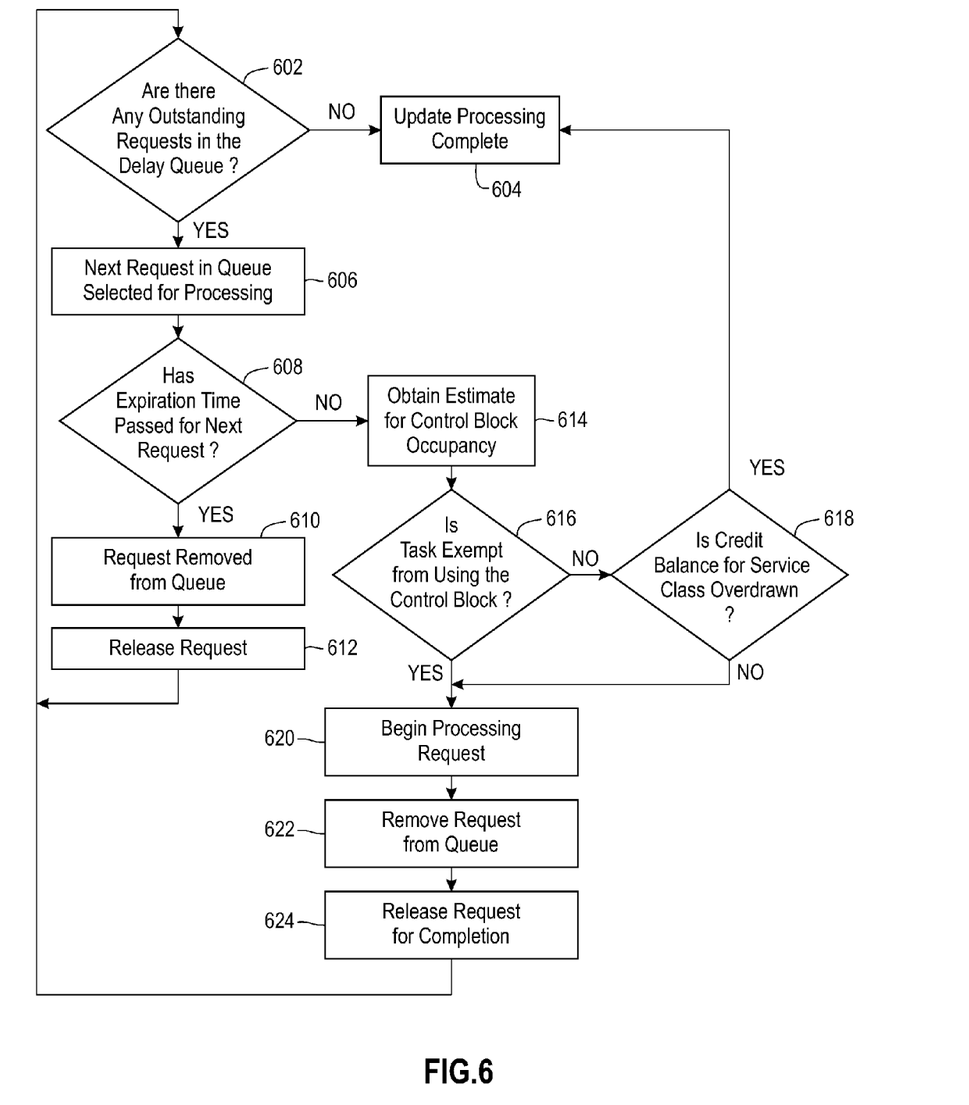
FIG. 6 is a flow chart illustrating updating the delay queue for a service class.

FIG. 1 is a flow chart (100) illustrating a process of a server processing a request from a client that employs one or more control blocks for completion of the associated task. Initially, a request is generated by a client and received by a server (102). The arrival time of the request by the server is recorded (104), after which the server performs entry processing on the received request (106). Details pertaining to the server entry processing are shown in FIG. 2. It should be noted that part of the request entry processing includes placement of the request in a delay queue. In one embodiment, the delay queue is processed based upon a first-in-first-out (FIFO) scheme, although an alternate scheme may be utilized. Following the processing at step (106), it is determined if the request has been released (108). A negative response to the determination at step (108) is followed by a management thread waiting until a timer service allows the delay queue to be updated (118). Details of the process of updating the delay queue are shown in FIG. 6. In one embodiment, once the queue is updated there are three available options for the request. First, the request can be processed if the credit balance for the service class is not overdrawn. Second, the request can remain in the delay queue either because there are other requests in the delay queue that are scheduled to be processed before the subject request or because the credit balance for the service class is overdrawn. Third, the request can be released from the delay queue because the time available for the request to wait in the delay queue has expired. Following step (118), the process returns to step (108).

A positive response to the determination at step (108) is followed by determining whether the request has been released from the queue for processing (110). A positive response to the determination at step (110) is followed by acquiring the control block to support the request processing and recording the time for the control block acquisition (112), performing the processing step of the request that requires use of the control block (114), and releasing the control block following completion of the processing step including recording the time of the control block release (116). Part of the processing of the subject request includes the server reporting the status of the request processing to the client. Accordingly, upon processing a request, the time at which the control block is acquired due to starting processing of the request and the time at which the control block is released due to completion of the request are recorded.

In some embodiments a control block is a data structure in the computer memory which can be dynamically attached to and detached from the data structure associated with a task, the acquire action of step (112) includes performing that dynamic attachment, and the release action of step (116) includes performing that dynamic detachment action. In some other embodiments, the data structure associated with a task may have permanently attached to it a second data structure which is related to the control block, but which second data structure is not usable as a control block until in step (112) a change is made that marks that data structure as acquired, and which second data structure again becomes unusable as a control block when in step (116) a change is made that marks that data structure as released.

However, if at step (110), it is determined that the request has not been released for processing, the server generates a rejection status for the subject request (120). Following either the completion of the request processing at step (116) or the server generating a rejection status for the request at step (120), the server updates the request processing (122). Details of the request processing update are shown and described below in FIG. 4. Following the processing at step (122), the request processing is completed for the subject request (124). Accordingly, for each request placed in the delay queue, it is either processed within a defined period of time with the control block acquisition and released times recorded, or released from the delay queue because the time for processing has lapsed.

In some embodiments, there are processing steps following the positive response to the determination at step (110) and prior to step (112). Likewise in some embodiments, there are processing steps following step (116) and prior to step (122). Thus it is possible that the acquisition and release of the control block could be separated from the decisions that control the rate of occupancy. For example, in a distributed computer system, steps (110) and (122) might be performed on one computer whereas (112), (114) and (116) are performed on a different computer.

As noted above, each request from a client machine is received by a server for processing, including allocation of control blocks to support the request. It is recognized that there may be different service classes of requests. FIG. 2 is a flow chart (200) illustrating the server end of processing a new request based upon the classification of the request and the availability to its service class of control blocks required to support the request. Initially, the subject request is received by the server (202). When the server receives the request, it inspects the details of the request to ascertain the service class assigned to the request (204). In one embodiment, each service class may employ a different selection of resources, and as such, each service class is assigned to a delay queue pertaining to the service class, with a separate delay queue for each service class. The operational limits of a service class are determined from performance characteristics of the system resources and from the level of performance guaranteed to each client. By regulating the client's usage of resources based on the resource operational limits, total system performance requirements can be achieved and guaranteed. The individual operations which constitute the request are examined and may be delayed as necessary to ensure that the resource of the control block(s) to support the request do not exceed acceptable limits of available resources. Following step (204), a balance update for the control block account balance for the subject class is performed (206). Details of the balance are shown and described in detail in FIG. 5. Once the credit balance for the class has been updated, a cost for processing the request is estimated, i.e. resource usage expected for servicing the request, is determined (208). In one embodiment, the cost estimate at step (208) is used as the entry cost for processing the request. Similarly, in one embodiment, an expiration time for processing the request may be calculated and associated with the request (210). Employment of an expiration time prevents a request from being in the delay queue for an extended period of time. Following step (210), the subject request that was received by the server at step (202) is placed in the delay queue for the service class (212). Once the request is in the appropriate delay queue, processing of the delay queue for the subject service class is initiated (214), as shown in detail in FIG. 6, and the initial processing of the request is completed (216). Accordingly, each request has an entry cost that is ascertained prior to placement of the request in the delay queue for processing.

Figure 3:
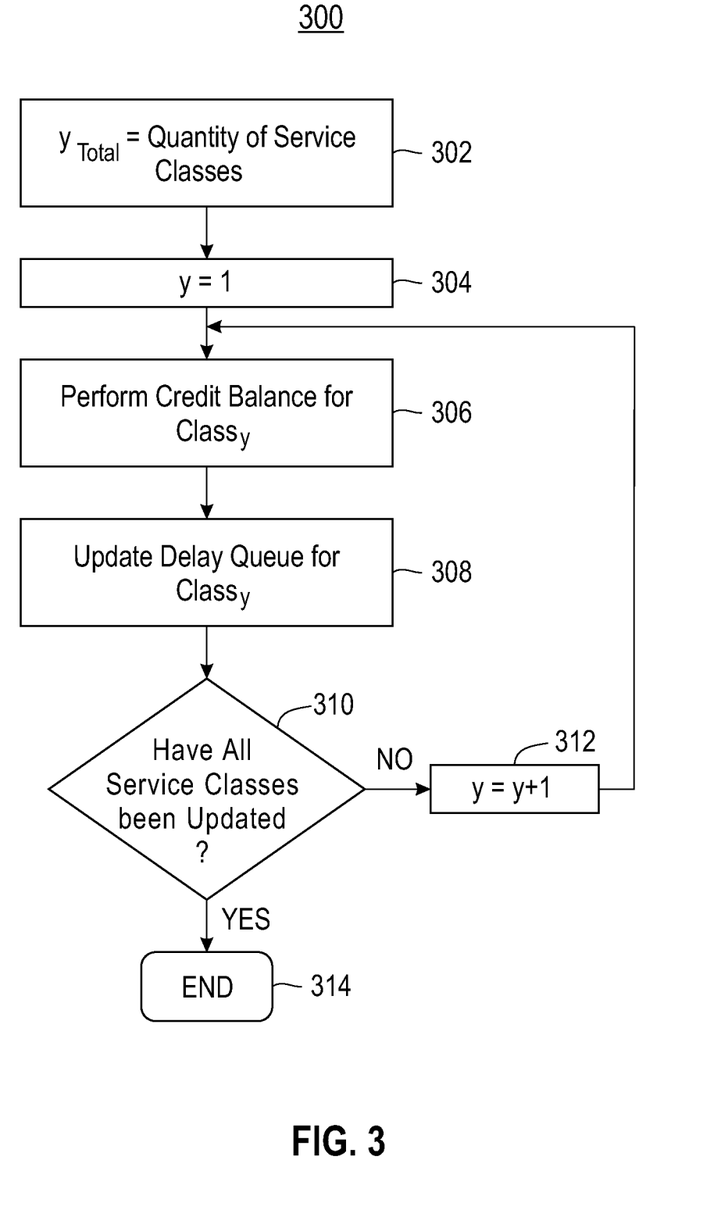
FIG. 3 is a flow chart illustrating updating each service class in the server.

The server owns the service classes, i.e. the resources of the control block, to process the request. There is a finite quantity of control blocks and service classes in the system. As such, the server knows the quantity of service classes that are present in the system. FIG. 3 is a flow chart (300) illustrating the process for updating each service class in the server. The variable $Y_{Total}$ is assigned to the quantity of service classes (302), and the counting variable Y is assigned to the integer one (304). Each service class has its own delay queue in the server. For class$_Y$, a credit balance update procedure is performed (306). Details of the balance update procedure are shown and described in detail in FIG. 5. Following step (306), the server updates the delay queue for class$_Y$ (308). Details of updating the delay queue are shown and described in detail in FIG. 6. Following completion of step (308), it is determined if all of the service classes have been subject to a credit balance update (310). A negative response to the determination at step (310) is followed by an increment of the counting variable (312), followed by a return to step (306). Conversely, a positive response to the determination at step (310) concludes the process of updating the service classes (314). In one embodiment, a thread may be employed to update the credit balance and delay queue for each service class. Accordingly, the delay queue and associated credit balance for a service class is periodically updated to ensure that the times at which requests are released for processing are correctly based upon current control block allocation and usage.

Figure 4:
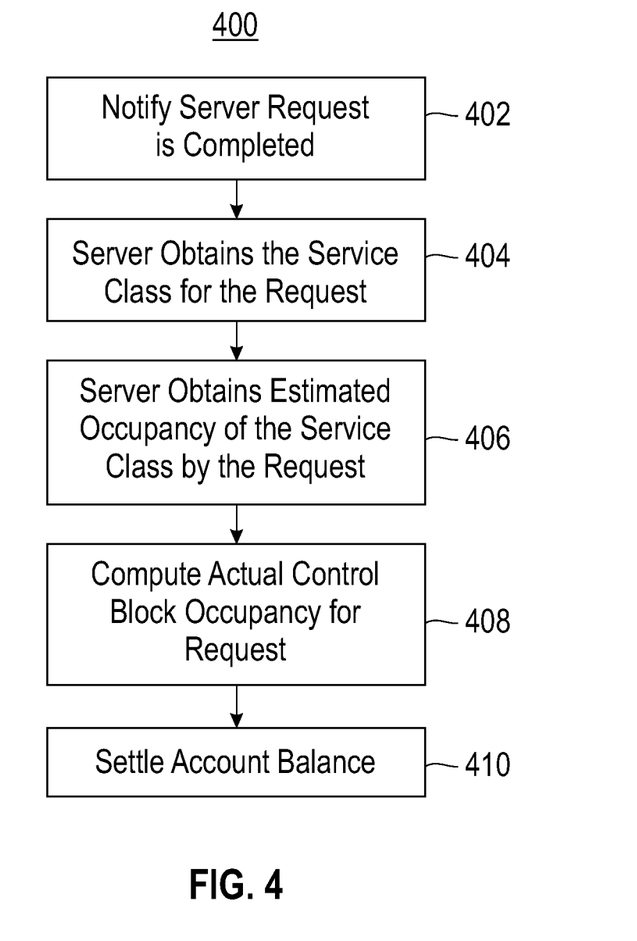
FIG. 4 is a flow chart illustrating updating the occupancy of the control blocks by a specified class of resources.

Once a request has been processed, the actual usage of the control blocks can be ascertained, as opposed to the estimated usage determined prior to processing the request. To properly balance usage of the control blocks for the different service classes and to prevent starvation of control blocks, the actual usage of the control blocks is updated to enable fair and balanced employment of the resources. FIG. 4 is a flow chart illustrating a process for updating the occupancy of the control blocks by a specified class of resources. Once the request for a specific class of resources is completed, the server is notified (402). The server obtains the service class for the request (404), and obtains the estimated occupancy of the service class by the request (406). As shown in FIG. 1, both the times at which the control block is acquired and released are recorded. See steps (112) and (116). The actual control block occupancy for the request is calculated as the difference in the actual recorded times (408). Once the actual control block occupancy is determined, the balance for the class is determined with actual data (410), as opposed to estimated data. In one embodiment, the adjustment to the balance is the difference between the estimated control block occupancy and the actual control block occupancy. Following completion of step (410) the control block occupancy data is complete. In one embodiment, the completion of step (410) is followed by proceeding to FIG. 6 to perform an update of the delay queue for the same control block class. Otherwise, the occupancy update is completed following step (410). Accordingly, the control block account balance for each service class is updated following completion of processing of a request from the delay queue for the specified service class.

The control block account balance for each service class and each control block type is a value used in controlling the operational decisions of the system. It is related to the theoretical account balance, which is a mathematical quantity which varies as a function of time. The theoretical account balance at a specified time is the cumulative occupancy of control blocks to which the service class has been entitled, minus the actual cumulative occupancy as of that time. A control block is in use from the time it is acquired to the time it is released. At any given time, the collection of control blocks that are not in use is shared across multiple different service classes. The theoretical account balance changes continuously over time at a rate equal to the allowed occupancy rate for the service class minus the current actual occupancy for the service class, except that it does not increase above a maximum carryover balance for the service class. In one embodiment, the theoretical account balance exists mathematically without necessarily being computed and used. Accordingly, the control block account balance is updated to be an estimate of the theoretical account balance, but it is not required that the computed value be precisely equal to the theoretical account balance.

Figure 5:
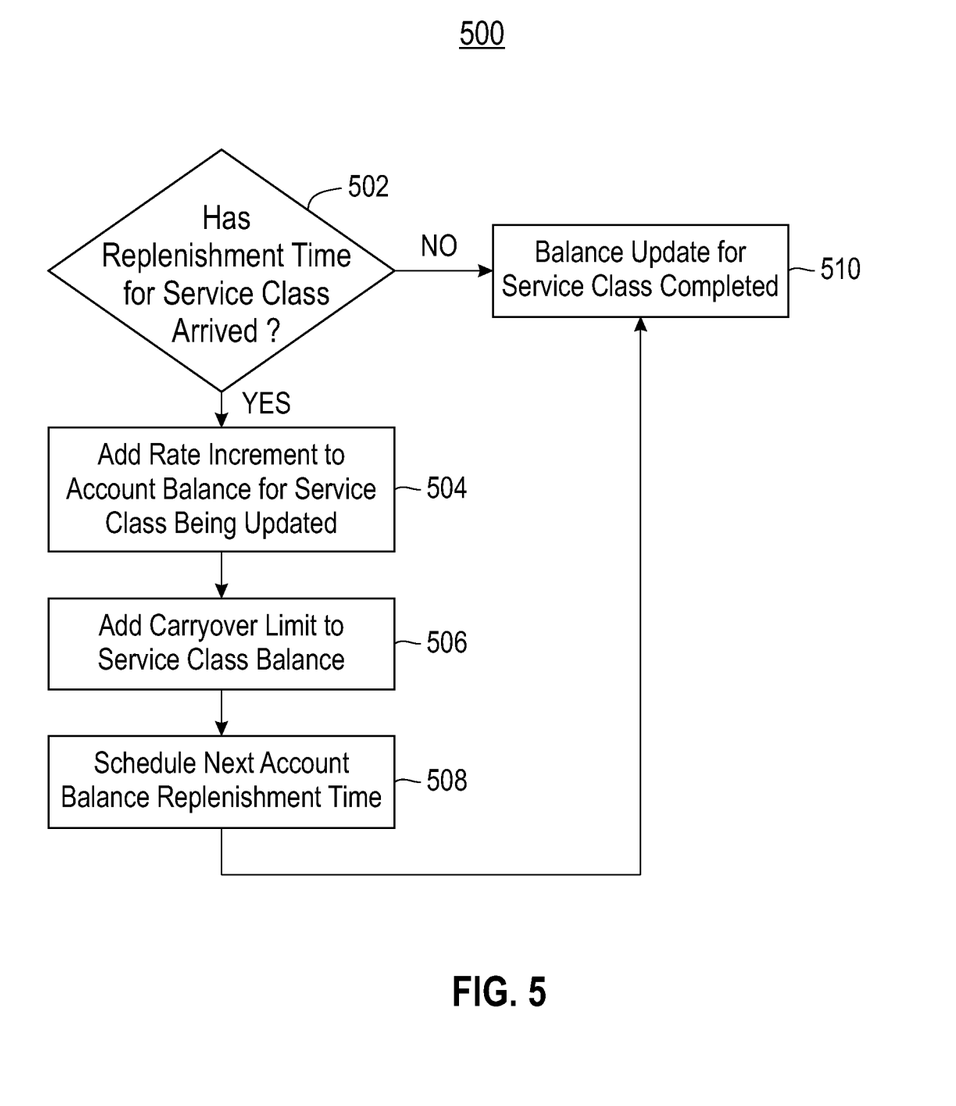
FIG. 5 is a flow chart illustrating updating the control block balance for each service class of control blocks.

FIG. 5 is a flow chart (500) illustrating the details of updating the control block balance for each service class of control blocks. To perform an update of the balance for the service class, it is initially determined if the replenishment time for the service class has arrived (502). In one embodiment, the balance for the service class is periodically updated, and as such, at step (502) it is determined if the scheduled replenishment frequency has occurred. A positive response to the determination at step (502) is followed by the server adding the rate increment to the account balance for the service class being updated (504). There are limits pertaining to the balance that may be attained in each service class so that one service class cannot be employed to exceed use of the subject control blocks. Following step (504) the balance values for the service class are reduced so that the limit is not exceeded (506). The next scheduled time for replenishing the balance for the service class is determined (508). Following a negative response to the determination at step (502) or following step (508), the balance update for the service class is completed (510). Accordingly, upon replenishing the balance for the service class, it is ensured that a maximum carryover balance for the service class is not exceeded.

As discussed above, each service class has an associated delay queue for processing client requests. In one embodiment, each request is placed in the subject delay queue and processed on a first-in-first-out basis. FIG. 6 is a flow chart (600) illustrating a process for updating the delay queue for a service class. In one embodiment, the delay queue is updated following a replenishment of the control block balance of the account for the service class, see FIG. 5, or following the process of appending the delay class queue with a new request. Initially, it is determined if there are any outstanding requests in the delay queue for the subject service class (602). More specifically, the determination at step (602) includes assessing whether or not the delay queue is empty. If the queue is empty, the process of updating the queue is completed as there are no requests waiting to be processed (604). Conversely, if the queue is not empty, the next request in the queue is selected for processing (606). It is then determined if the expiration time for the next request has passed (608). As noted above, each request has an associated expiration time in the delay queue. If the expiration time has passed, the subject request is removed from the delay queue (610) and released (612), followed by a return to step (602) to process the next request in the queue. Conversely, if at step (608) it is determined that the expiration time for the next request in the delay queue has not passed, an estimate of the control block occupancy is obtained (614). In one embodiment, the control block occupancy for each service class is maintained in a data structure and calculated at step (208) in FIG. 2. Furthermore, as noted above, each service class has a control block account balance for control block usage for each request.

Once the control block estimated occupancy is obtained at step (614), it may be determined that a given task is exempt from the limits of this rate because it is known at task entry that it will not acquire a control block. Based upon this embodiment, it is determined if the given task is exempt from using the control block (616). A negative response to the determination at step (616) is followed by determining if the control block account balance for the service class is overdrawn (618). More specifically, the determination at step (618) ascertains whether the service class for the subject request has a remaining credit balance that can accommodate processing of the request based upon the estimated cost of processing. If there is a negative response to the determination at step (618), or a positive response to the determination at step (616), the processing of the request is allowed to begin (620), including charging the entry cost for the request against the balance. The request is then removed from the queue (622) and released for completion (624), followed by a return to step (602) to process the next request in the queue. Conversely, a positive response to the determination at step (618) indicates that there is not a sufficient balance for processing, and as such is followed by a return to step (604). Accordingly, the process shown herein demonstrates processing of the next request present in the queue based upon the available credit balance for usage of the service class control blocks and an estimated cost for processing the request.

For each class and each control block, a control block account balance is maintained and adjusted in response to both passage of time and processing of tasks. As each request is pending admission for processing, an entry cost value is computed for each managed control block type. In some embodiments the entry cost is computed for each task from the attributes of the task. In other embodiments the entry cost is set to zero for every task. The request is admitted for processing only when the control block account balance is not overdrawn, that is the value is not negative. To perform an accurate update of the control block account balance, the time is recorded when the task acquires a control block and when the task releases the control block. The difference between release time and acquisition time for each control block is regarded as a processing cost for that task. In one embodiment, acquisition of multiple control blocks results in the cost being the sum of the total cost for each control block. The exit cost for the control block type is the difference between the total processing cost and the entry cost for each control block type. The exit cost is then subtracted from the control block account balance for that class and that control block type to maintain an accurate control block account balance. As time passes, the control block account balance for each control block type is replenished. In one embodiment, the increase is based upon an allowed tenancy rate for the specific service class. Similarly, in one embodiment, there is a limit associated with replenishment to ensure that any one class does not accumulate, during times of low usage, an excessive control block account balance that would subsequently permit so many requests from that class to be processed as to effectively create starvation of one or more other service classes. Accordingly, the control block account balance is employed to equitably distribute usage of the control blocks among multiple requests received from one or more client machines.

Figure 7:
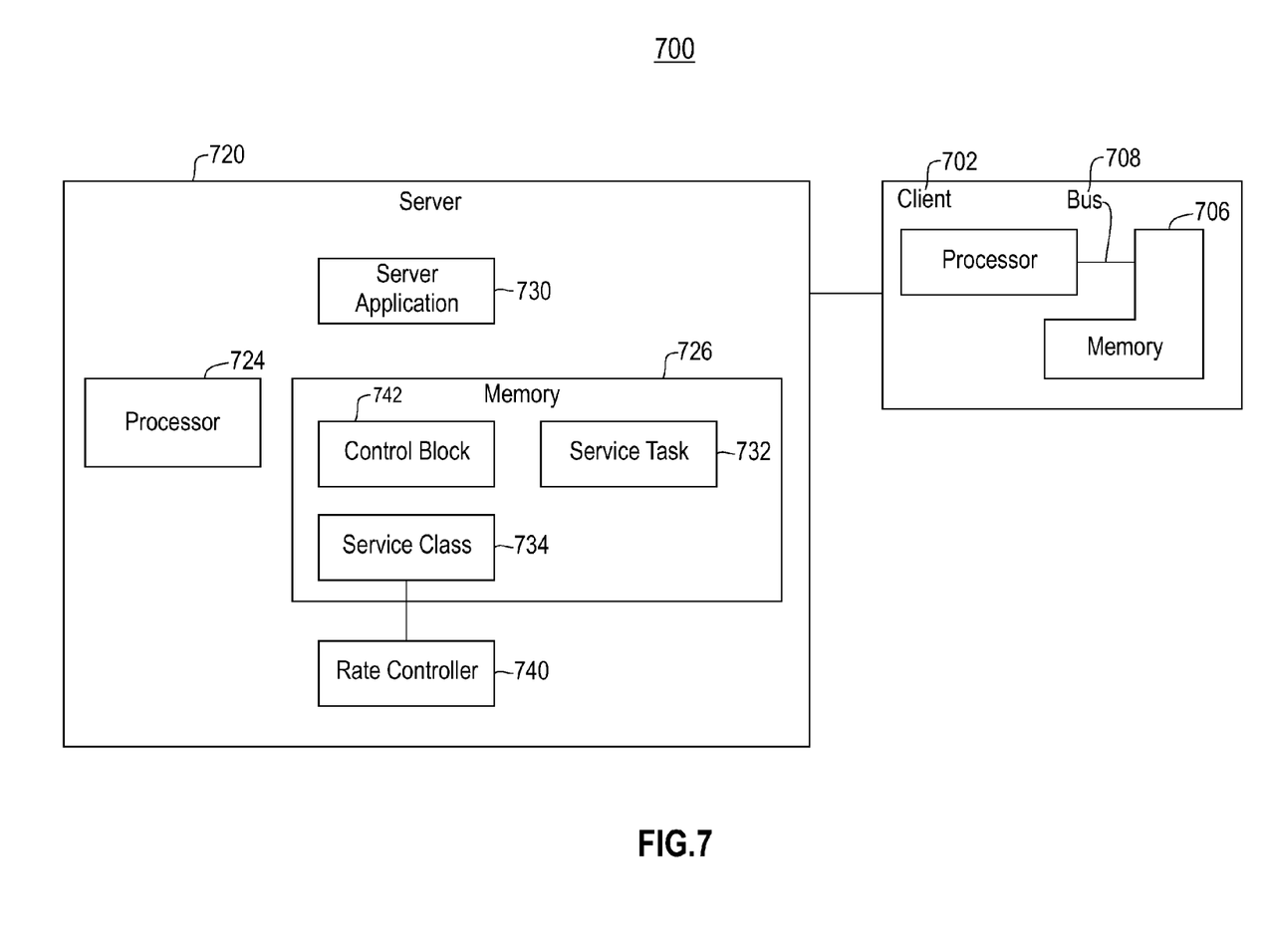
FIG. 7 is a block diagram showing components in the system to support application of limits to a control block occupancy rate according to the preferred embodiment of this invention, and is suggested for printing on the first page of the issued patent.

As described above, limits are applied to a control block occupancy rate in order to equitably distribute access to control blocks to multiple requests. FIG. 7 is a block diagram of a computer system illustrating tools embedded in the server to accommodate management of control block allocation. As shown, a client machine (702) is provided in communication with a server (720) across a network (715). The client machine is shown with a processor (704) in communication with memory (706) across a bus (708). Similarly, the server (720) is shown with a processor (724) in communication with memory (726) across a bus (728). A server application (730), also referred to herein as a manager, is provided local to the server (720). The server application (730) is configured to receive a request from the client machine (702), to represent that request using a service task (732) in the memory (726) of the server (720) and to assign the service task(s) to a service class (734). Each service class (734) is configured by a rate controller (740), also referred to herein as a cost manager, to determine when the service task may be released to the server application (730) for processing. More specifically, the rate controller (740) determines an allowed occupancy rate, and determines the actual control block tenancy rate as an aggregate of the tenancy times of the tasks in the service class. The rate controller (740) functions to release tasks for processing so that the actual control block tenancy rate is in accordance with the allowed occupancy rate. In one embodiment, the rate controller (740) may increase the control block account balance (also referred to herein as a credit balance) in proportion to the allowed occupancy rate and time elapsed, and may decrease the control block account balance following completion of the task in proportion to the actual tenancy time of the control block. Furthermore, in one embodiment, the rate controller (740) may increase the control block account balance or decrease the control block account balance. More specifically, the control block account balance may be increased based upon the allowed tenancy rate and time elapsed since a prior increase, and the control block account balance may be decreased based upon completion of each task in proportion to the tenancy of a corresponding control block type. In response to receipt of a request and creation of a task for the request, the server application (730) directs the task to the rate controller (740) for the service class (734) of the task; the rate controller (740) maintains the control block account balance for the service class (734) and determines when the task is released for processing; the manager (730) acquires at least one control block (742), performs processing that requires the control block (742), and releases the control block (742); and the rate controller (740) updates the control block account balance for the service class (734) upon completion of the task. The task is released for processing when the control block account balance is not less than zero.

In another embodiment a single server application may be distributed over a plurality of servers, each server having its own processor and memory, and service tasks, service classes and rate controllers. In this embodiment the pool of control blocks whose occupancy is controlled may be distributed equally or unequally over the servers, and may reside entirely on one server. The action of a given rate controller is to control the occupancy rate of control blocks that do not necessarily reside on the same server, for its service class. The result of the operation of all rate controllers together is to manage the total occupancy of that pool of control blocks.

In another embodiment a single server application may be distributed over a plurality of servers, and there are multiple types of control blocks, each type being distributed to a greater or lesser degree. For example, control blocks which are otherwise similar might be regarded as of different types because they reside on different servers and are used for processing steps on the same server. For each service class there are multiple rate controllers, one for each type of control block. A task must be released by every rate controller associated with its service class before it is released to the server application for processing.

Embodiments within the scope of the present invention also include articles of manufacture comprising program storage means having encoded therein program code. Such program storage means can be any available media which can be accessed by a general-purpose or special-purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-usable or computer-readable medium providing program code for use by or in connection with a computer or any instruction execution system.

Advantages

A credit balance is maintained for control blocks employed to service tasks within a service class. The credit balance is employed to ensure a fair and balanced allocation of the control blocks in a manner that does not lead to starvation of one service class over another service class. As a matter of efficiency, an estimate of the credit balance may be employed prior to processing of a request. If there is sufficient credit available in the account for the service class, the request may be processed. Similarly, if there is an insufficient credit in the account for the service class, the request is not processed. Based upon the credit availability, once the request is processed the account for the control blocks service class may be balanced based upon occupancy time for the actual processed request. Accordingly, an estimate is used to determine processing of a request, after which the tenancy time for each control block is measured and charged against the credit balance.

Alternative Embodiments

It will be appreciated that, although specific embodiments of the invention have been described herein for purposes of illustration, various modifications may be made without departing from the spirit and scope of the invention. In particular, the processes for updating the service class, occupancy of the control blocks, updating the control block balance, and updating the delay queue may each be performed by separate queues that run concurrently or sequential to processing of a request in a select service class. Similarly, each of the update processes may employ separate threads for separate and distinct service classes. Accordingly, the scope of protection of this invention is limited only by the following claims and their equivalents.

I claim:

1. A method for improving computer system performance, comprising:
   receiving at least one service task from a client;
   assigning said received service task to a service class;
   for said service class, determining an allowed occupancy rate with reference to a total available occupancy rate, wherein said allowed occupancy rate is an allowed average number of tasks simultaneously served by its own control block, and wherein said control block is one of a collection of interchangeable resources to be associated with a single task;
   acquiring at least one control block for said at least one received task; and
   controlling a release of a control block for processing of a received task so that an actual tenancy rate for said service class is in compliance with said allowed occupancy rate, wherein an availability of the control block to be released for processing of the received task is dynamically monitored and update, separately for different service classes, in response to completion of tasks by said control block.

2. The method of claim 1, wherein controlling said release for processing a received task comprises:
   for the service class and control block type, maintaining and adjusting a credit value in response to passage of time and processing of tasks, wherein said credit value is calculated based upon factors including an allowed occupancy rate for said service class and an aggregated tenancy time of said control block for said tasks, said tenancy time defined as a time interval between an acquisition and release of said control block; and
   releasing said task for processing when said credit value is at least equal to an entry cost value for said task and said control block type.

3. The method of claim 2, wherein said entry cost value is computed based upon an estimated tenancy time for said task.

4. The method of claim 2, wherein said credit value is increased in proportion to said allowed occupancy rate and time elapsed and is decreased upon completion of said task in proportion to an actual tenancy time of said control block, wherein said rate of said increase is computed to compensate said rate of said decrease resulting from a task completion when said occupancy rate from completed requests is equal to said allowed occupancy rate.

5. The method of claim 2, further comprising increasing said credit value based upon said allowed tenancy rate and time elapsed since a previous increase.

6. The method of claim 2, further comprising decreasing said credit value based upon completion of each task in proportion to a tenancy of a corresponding control block type.

7. A system comprising:
   a server configured to communicate with a client machine;
   a manager coupled to said server and configured to receive at least one service task from said client and to selectively acquire at least one control block for said task;
   said received service task assigned to a service class having a director to determine an allowed occupancy rate with reference to a total available occupancy rate, wherein said allowed occupancy rate is an allowed average number of tasks each simultaneously served by its own control block, and wherein said control block is one of a collection of interchangeable resources to be associated with a single task; and
   wherein for said service class, said director is further configured to control a release of a control block for processing of each task, so that an actual tenancy rate for said service class is in compliance with said allowed occupancy rate, wherein an availability of the control block to be released for proceeding of said task is dynamically monitored and updated, separately for different service classes, in response to completion of tasks by said control block.

8. The system of claim 7, further comprising said director to maintain and adjust a credit value in response to passage of time and processing of tasks, wherein said credit value is calculated based upon factors including an allowed occupancy rate for said class and an aggregated tenancy time of said control block for said tasks, said tenancy time defined as a time interval between an acquisition and release of said control block; and said director to release said task for processing when said credit value is at least equal to an entry cost value for said task and said control block type.

9. The system of claim 8, wherein said entry cost value is computed based upon an estimated tenancy time for said task.

10. The system of claim 8, further comprising said director to increase said credit value in proportion to said allowed occupancy rate and time elapsed and to decrease said credit value upon completion of said task in proportion to an actual tenancy time of said control block, wherein said rate of said increase is computed to compensate said rate of said decrease resulting from a task completion when said occupancy rate from completed requests is equal to said allowed occupancy rate.

11. The system of claim 8, further comprising said director to increase said credit value based upon said allowed tenancy rate and time elapsed since a previous increase.

12. The system of claim 8, further comprising said director to decrease said credit value based upon completion of each task in proportion to a tenancy of a corresponding control block type.

13. An article for improving computer system performance, said article comprising:
a computer-readable non-transitory storage medium having computer-readable program code embodied therewith, said computer readable program code comprising:
computer readable program code to receive at least one service task from a client;
computer readable program code to assign said received service task to a service class;
computer readable program code to determine for said service class an allowed occupancy rate with reference to a total available occupancy rate, wherein said allowed occupancy rate is an allowed average number of tasks each simultaneously served by its own control block, and wherein said control block is one of a collection of interchangeable resources to be associated with a single task;
computer readable program code to acquire at least one control block for a task; and computer readable program code to control a release to process each task so that an actual tenancy rate for said service class is in compliance with said allowed occupancy rate, wherein an availability of the at least one control block to be released for processing of said task is dynamically monitored and update, separately for different service classes in response to completion of tasks by said at least one control block.

14. The article of claim 13, wherein said computer readable program code to control said release for processing of each task comprises: maintaining and adjusting a credit value in response to passage of time and processing of tasks, wherein said credit value is calculated based upon factors including an allowed occupancy rate for said class and an aggregated tenancy time of said control block for said tasks, said tenancy time defined as a time interval between an acquisition and release of said control block; and releasing said task for processing when said credit value is at least equal to an entry cost value for said task and said control block type.

15. The article of claim 14, wherein said entry cost value is computed based upon an estimated tenancy time for said task.

16. The article of claim 14, wherein said credit value is increased in proportion to said allowed occupancy rate and time elapsed and is decreased upon completion of said task in proportion to an actual tenancy time of said control block, wherein said rate of said increase is computed to compensate said rate of said decrease resulting from a task completion when said occupancy rate from completed requests is equal to said allowed occupancy rate.

17. The article of claim 14, further comprising computer readable program code to increase said credit value based upon said allowed tenancy rate and time elapsed since a previous increase.

18. The article of claim 14, further comprising computer readable program code to decrease said credit value based upon completion of each task in proportion to a tenancy of a corresponding control block type.

* * * * *